Feb. 8, 1966  H. W. MARSH  3,233,862
FLUID PRESSURE BALANCED SEAL
Filed Oct. 3, 1961  3 Sheets-Sheet 3

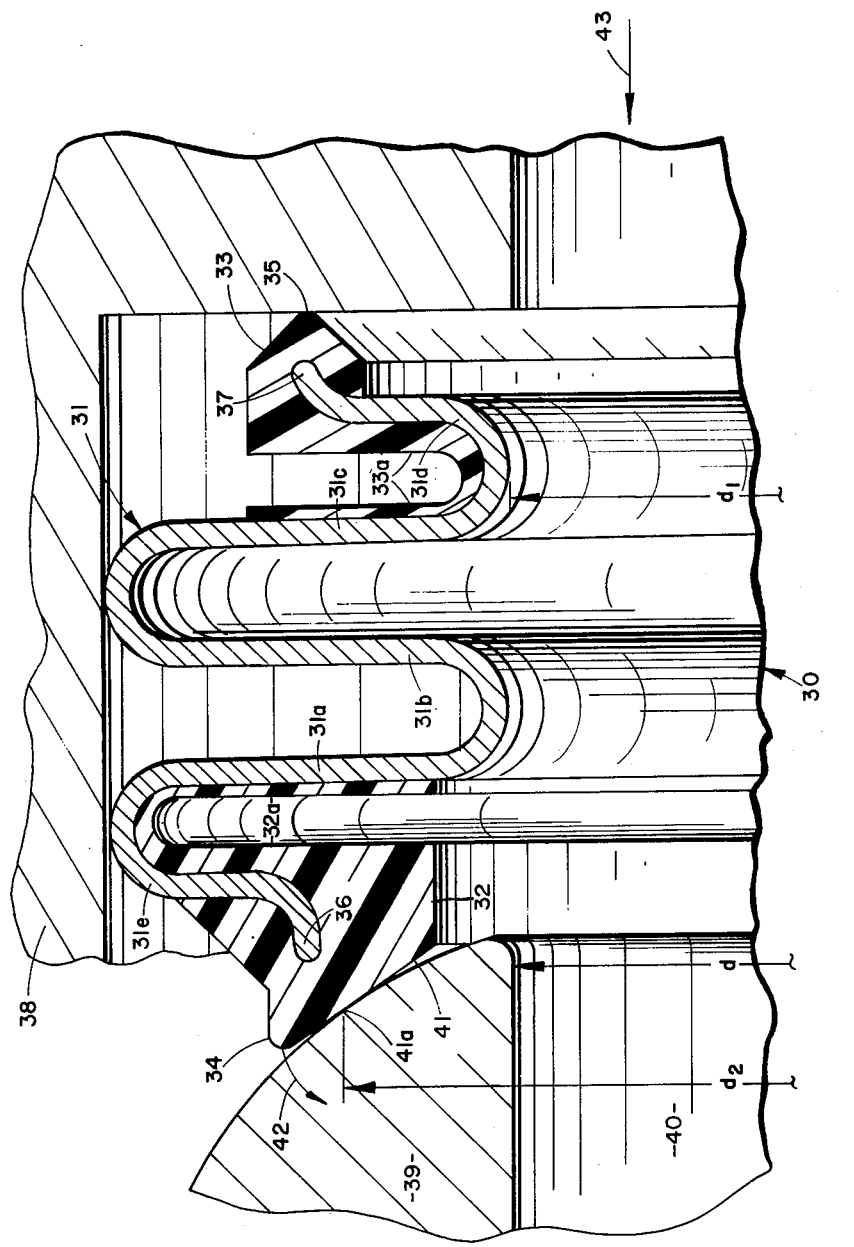

INVENTOR.
HOLDRIDGE W. MARSH

BY

AGENT

United States Patent Office 3,233,862
Patented Feb. 8, 1966

3,233,862
FLUID PRESSURE BALANCED SEAL
Holdridge W. Marsh, Woodland Hills, Calif., assignor to North American Aviation, Inc.
Filed Oct. 3, 1961, Ser. No. 142,583
5 Claims. (Cl. 251—172)

This invention relates to a pressure actuatable seal. More particularly, it relates to a seal which increases in sealing effectiveness with pressure increase and which is capable of maintaining its sealing characteristics throughout both static and dynamic operational phases.

While not so limited in application, the present seal finds particular utility in the sealing of ball valve ports.

Seals of the prior art have utilized fluid pressure for providing more effective seals than seals otherwise conventionally constructed. However, such seals have been capable of sealing under static conditions only. When it has become necessary that a single seal be provided for operation under both static and dynamic conditions, for example, in ball valve port seals, a sliding seal between the valve housing outlet and the ball has been provided. Such seal has usually consisted of an assembly of individual parts including an O ring adapted to seal between the valve housing and a support member, a sealing ring attached to an extremity of the support member, and a spring urging the sealing ring into contact with ported ball.

Resultant from the novel features of the present seal wherein the components are integrated into a single unit, the necessity for using the noted assembly including a multiplicity of individual structural components is precluded. This inherently reduces the seal's susceptibility to mechanical failure and eliminates a number of potential leak paths.

It is an object of this invention to provide a seal wherein sealing effectiveness is enhanced as fluid pressure increases.

Another object is to provide a seal capable of functional utility under both static and dynamic fluid sealing conditions.

Yet another object is to provide an integral seal member capable of sealing two opposed surfaces simultaneously.

A further object is to provide a seal not unduly affected by small misalignments.

A still further object is to provide a "balanced" multiple convolution bellows seal capable of positive sealing contact throughout functional operation under conditions of either internal or external pressurization.

Another object is to provide a seal capable of deformation to conform to slight irregularities in seal or sealable surface contours.

Yet another object is to provide a seal usable over wide temperature ranges.

Other objects of invention will become apparent from the following description taken in connection with the accompanying drawings in which:

FIG. 3 is a cutaway section of an embodiment of the invention including a plurality of convolutions, the seal being installed in a typical manner with a ball valve;

The pressure responsive seal of the present invention in its broad concept comprises an annular convoluted spring member including at least one convolution, seal means capable of sealing under dynamic conditions affixed to at least one of the terminal ends thereof, the spring member being axially elongatable responsive to fluid pressure acting within the convolutions so as to move the seal means into more firm and effective contact with an adjacent sealable surface.

Figure 1:
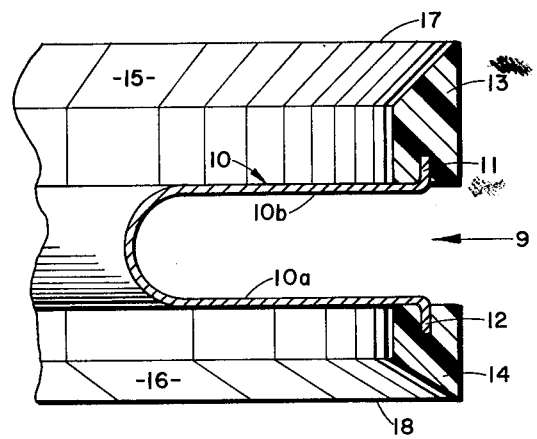
FIG. 1 is a cutaway section of a typical seal of the present invention.

Referring now to the drawings, seal 9 of FIG. 1 is illustrated in a basic embodiment. A continuous annular convoluted spring member 10 includes a pair of oppositely outward extending peripheral terminal members or tips 11 and 12. Legs 10a and 10b are adapted to be distended (moved apart) when fluid pressure is introduced intermediate thereof. Attached to tips 11 and 12 for movement therewith are a pair of sealing rings 13 and 14. These rings are constructed from a material of relatively softer consistency than is spring member 10. They are also relatively softer than the sealable surfaces against which they are adapted to seal for most effective sealing. Materials commercially known as Teflon (tetrafluoroethylene), Kel-F (monochloro-trifluoroethylene) and nylon (fiber-forming long chain polyamide) are examples of materials particularly desirable for such sealing ring. The specific material selected is dependent upon temperature, pressure, corrosivity and other variable factors.

While the specific design of sealing rings 13 and 14 may be varied to conform to structural features for particular applications, it is generally preferable that the sealing contact surface be designed such that high unit loading characteristics are maintained throughout functional sealing sequences. In the configuration of FIG. 1 sealing surfaces 15 and 16 are beveled. Their termination as tips 17 and 18 provide enhanced sealing capabilities resultant from the ability to flex responsive to pressure and deform to seal irregularities in the surface contacted.

Figure 2:
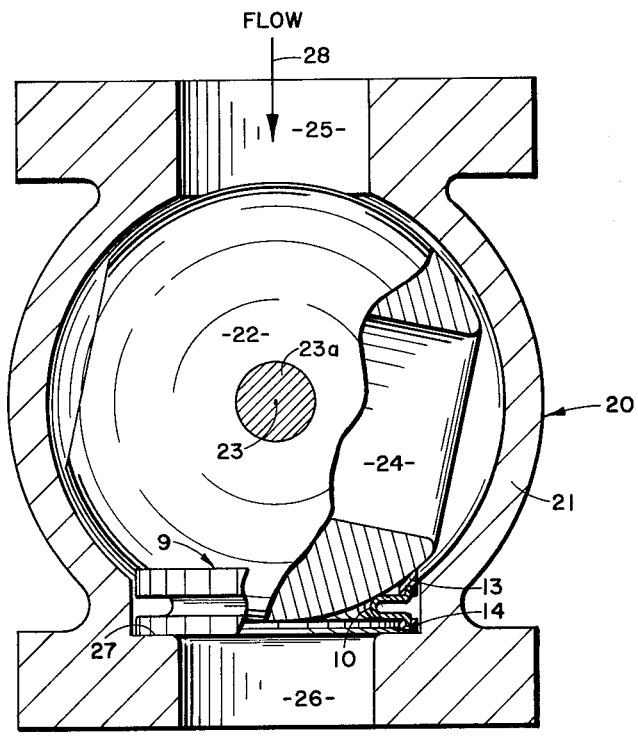
FIG. 2 is a cutaway section of a simple ball valve including the seal of the present invention.

The manner in which the seal is adapted to a valve is representatively illustrated in FIG. 2, the valve here being a ball valve. Seal 9 is installed within housing 21 of ball valve 20. Valve 20 includes a rotatable ball member 22 adapted for rotation either clockwise or counterclockwise about axis 23. Suitable actuator means (not shown) is provided to accomplish the rotation, for example, by attachment to shaft 23a. Ball 22 includes a passage 24 therethrough adapted for alignment with housing ports 25 and 26 during fluid transfer phases and for orientation in the essentially transverse direction illustrated during fluid shut-off phases. Seal 9 is installed within valve housing 21 such that seal ring 13 contacts a peripheral segment of ball 22 and ring 14 contacts a shoulder 27 of the valve housing. Spring member 10 serves to give a continuous separating force to the seal rings for line pressure operation. The convolution portion of spring member 10 extends radially inward from the sealing ring members. This is a factor of importance in the illustrated valve application in assuring seal functional capabilities.

When fluid enters valve 20 of FIG. 2 in the direction of arrow 28, it traverses the outer periphery of ball 22 until it contacts seal 9. Fluid enters the channel region of spring member 10 and acts to distend legs 10a and 10b (FIG. 1), forcing seal rings 13 and 14 into a more forcible contact with ball 22 and shoulder 27. Since it is preferable in the instant configuration that sealing ring 13 is constructed such that only an outer segment of beveled surface 15 (FIG. 1) near tip 17 actually contacts the ball surface, the fluid pressure simultaneously causes tip 17 to be flexed inward against the ball surface, further increasing sealing effectiveness. The ability of the relatively soft material from which rings 13 and 14 are fabricated to deform responsive to pressure provides the seal with the capability of compensating for slight irregularities in either the ball or the seal surface.

When ball 22 is rotated toward the open position, the resulting interconnection of passage 24 with port 26 also pressurizes the internal side of the spring member. The resulting tendency toward a pressure balanced condition results in partial seal deactivation, reducing its forcible sealing engagement with adjacent parts. This allows the ball to turn more freely than during pressurized operational phases and prevents undue wear on the ring surfaces during valve opening and closing sequences.

Certain seal applications require that a seal have the capability of sealing not only while in the normally opened position, but also during brief periods of reverse flow for purge purposes. The seal configuration of FIG. 3, wherein seal 30 is installed in a ball valve in substantially the same manner illustrated in FIG. 2, is particularly useful in this respect. This generalized configuration is referred to as a "balanced" seal. Seal spring member 31 of seal 30 includes a plurality of convolutions. The number of convolutions utilized depends upon the design requirements of particular applications. It is preferable for the instant application, however, that the interior and exterior of the bellows include at least substantially equal surface areas adapted to be exposed to actuating fluid pressures. In other words, were fluid pressures applied equally to both the interior and the exterior of the bellows, the theoretical result would be an exact pressure balance. In this case, the main sealing force is supplied by spring tension inherent in the spring member per se in its installed position. This exact pressure balance characteristics is varied in certain configurations to achieve what is referred to as an "actual balance" or an "over balanced" condition. The "actual balance," as explained in greater detail below, provides for a minimum bellows elongation commensurate with the insured maintenance of a positive sealing contact throughout all phases of operation of the device to which the seal is adapted. The seal configuration of FIG. 3 is basically a balanced pressure type bellows seal which may include either of the "actual" or "over balance" features.

Seal 30 includes sealing rings 32 and 33 terminating in tips 34 and 35, respectively. Diametrically, tips 34 and 35 or the sealable contact points to be later described are located approximately intermediate of the inner and outer extremities of spring member 31. Otherwise stated, tips 34 and 35 or the sealable contact points are axially aligned upon the center line of the spring member convolutions. Pressure equalization internally and externally of the spring member is thereby obtained. The sealing ring material in the FIG. 3 configuration is disposed not only axially outward from the spring member extremities, but a portion of the material is disposed internally of a convolution adjacent each end of the spring member, as indicated by numerals 32a and 33a. This assists in eliminating leak paths around the spring member tips or terminal members 36 and 37 resultant from the fact that pressure acting internally of the convolution wherein the material is disposed forces that material outward against the spring member legs, thereby increasing the sealing effectiveness.

The supporting structure and sealable hardware of FIG. 3 are similar to that of FIG. 2.

The FIG. 3 structure indicated as 38 is representative of the valve housing wherein seal 30 is disposed. Partially illustrated ball 39, typically retained within housing 38, contains a passage 40, preferably having a diameter $d$ smaller than internal diameter $d_1$ of spring member 31. Thereby, slight axial misalignment of passage 40 will not result in an unwarranted pressure drop within the seal region.

It will be noted that sealing ring 32 has a tapered surface 41 which contacts the surface of ball 39 near the outer extremity of tip 34. This sealing contact point is indicated as 41a. Pressure applied to the exterior of the seal causes a slight inward actuation of tip 34 (see arrow 42) to provide a more intimate sealing contact between the seal member and the ball sealable surface and to slightly increase the sealing contact area. The sealing contact nevertheless takes place over a relatively minor segmental area of tapered surface 41 to insure that the high unit loading characteristic of the seal are maintained. Sealing ring 33 also includes a high unit loading characteristic resulting from appropriate shaping of tip 35 in its contact with housing 38.

When pressure is applied only exteriorly of spring member 31, the result in a distension of bellows legs 31a and 31b and a similar distension of legs 31c and 31d. This causes the surface of ball 39 and the sealable surface of housing 38 to be contacted with an increased force substantially proportional to the increase in pressure being sealed. Similarly, when the pressure is applied only internally, legs 31a and 31e are distended, as are legs 31b and 31c, again causing the sealing rings to contact their respective sealable surfaces with a greater force. When the pressure internally of the bellows is matched by the external pressure, for example, while the valve is open, the actuating forces are equalized. Any sealing force remaining must, in an exactly pressure balanced seal, result from bellows compression introduced during installation.

The above noted "actual" balance in a seal is achieved by shifting sealing contact point or sealing diameter 41a (and/or 35) away from the root means square (R.M.S.) diameter $d_2$. The root mean square diameter of bellows 30 or its equivalent is located such that the area between the actual bellows center line and the outer diameter (O.D.) is equivalent to the area between the actual center line and the inner diameter (I.D.). On this basis the seal is designed with the R.M.S. diameter considered as the "balance diameter." The sealing contact point 41a normally located at the R.M.S. diameter, is then increased or decreased in diameter to control compressive or expansive loading of the bellows. If the number of bellows half-convolutions (the bellows loop between the R.M.S. diameter and either the O.D. or I.D.) working to expand the bellows is equivalent to the number of half convolutions working to compress it, then theoretically, no amount of pressure applied equally externally and internally should cause the bellows to deflect. When seal diameter 41a is increased, a condition will eventually be reached at which bellows expansion is positive, although not excessive, and the possibility of seal unloading (removal from its seat) during valve open phases is substantially obviated. It is this ultimate diameter wherein equal external and internal pressures result in a positive load condition which is referred to as the "actual" balance diameter. It has been determined that the "actual" balance diameter is approximately 1% greater than the R.M.S. diameter $d_2$. However, this may vary to some extent dependent upon bellows size and other design considerations. This percentage of movement is so small as to be incapable of accurate illustration in FIG. 3. Further outward movement of the contact point results in a greater unbalance of forces, eventually resulting in the seal noted as "over balanced."

Since a compressive load is always introduced into the bellows during installation some sealing force is ever present. When it is necessary that a purge fluid be introduced through the valve prior or subsequent to valve operation, it is introduced internally of the seal and usually from the direction of arrow 43. The purge pressure is usually relatively small and the inherent compressive load of the installed bellows is sufficient that the purge does not cause interruption of sealing contact, particularly in the actually balanced configuration.

Figure 4:
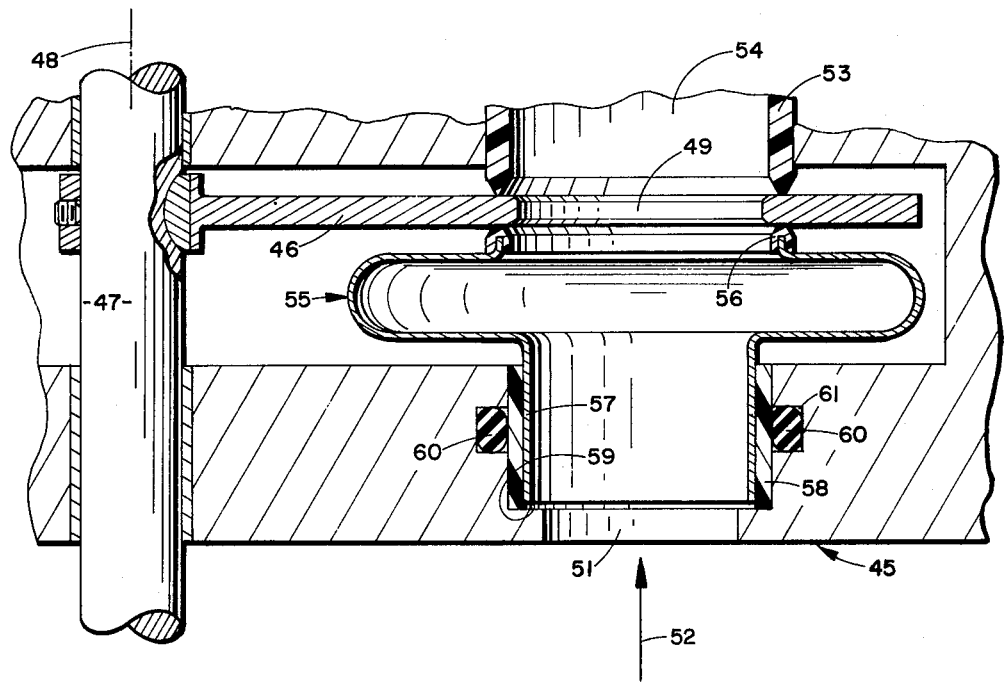
FIG. 4 is a partial section of a seal embodiment as typically used in a sliding blade or gate valve.

Another embodiment of the invention is illustrated in FIG. 4. A seal of the over balanced variety is here applied to a blade valve. The seal ring in this instance contacts a flat surface as distinguished from the spherical ball surface described above. This configuration also illustrates the applicability of a variation in sealing rings to the basic spring member.

The FIG. 4 representation of a so-called blade valve includes a housing 45 having a blade member 46 mounted therein and adapted to be rotated by a shaft 47 about shaft axis 48. Blade member 46 contains a perforation 49 therethrough to accommodate fluid passage when in the open position. Perforation 49 of blade member 46, and shaft 47, together with the proper sealing elements are positioned within housing 45 in or for alignment with a fluid passage 51 through the housing. Fluid passes through passage 51 in a direction indicated by arrow 52. A conventional cylindrical seal member 53 is retained within housing 45 so as to bear against and seal with respect to blade member 46. Passage 54 intermediate of cylindrical seal 53 serves as the fluid outlet. The seal of the present invention is indicated as numeral 55. It will be noted that since the fluid inlet is in the direction of arrow 52 and the seal 55 is in the fluid inlet between the housing passage and the blade member, seal 55 is provided with an external bellows-type convolution. The pressurized fluid introduced intermediate thereof may react upon the internal convolution surfaces to accomplish sealing in the manner described above. Seal 55 is provided with a sealing ring 56 which bears against a sealable surface of blade member 46. At its opposite extremity, seal 55 is provided with an axially directed flange extension 57 and a cylindrical sealing ring 58 is bonded or otherwise attached to flange extension 57 for movement therewith. Hence, when bellows flexing takes place, cylindrical sealing ring 58 moves axially downward against a shoulder 59 of housing 45 preventing fluid from traversing seal 58. Additional sealing effectiveness may be provided by the insertion of a standard O ring 60 into a groove 61 surrounding seal 58. It is preferable that flange extension 57 be terminated prior to its actual contact with shoulder 59 in order that axial movement may be provided to move sealing ring 58 into forcible sealing contact with shoulder 59 without structural interference.

When blade member 46 is in the position illustrated, perforation 49 being in alignment with passages 51 and 54, the valve is in the open or flow-through position. In order to close the valve, blade member 46 is rotated upon shaft 47 until perforation 49 is completely removed from alignment with passages 51 and 54, sealing members 53 and 56 then contacting only the flat, imperforate surfaces of blade member 46. In this closed position, the fluid pressure internally of seal 55 increases, causing the seal walls to be flexed outward from one another. This provides more effective sealing engagement between the sealing elements than during the opened phase. The bevels upon the seal tips act as guides in blade movement and prevent excessive seal-to-blade binding or scrapping as perforation 49 moves over the tips.

Figure 5:
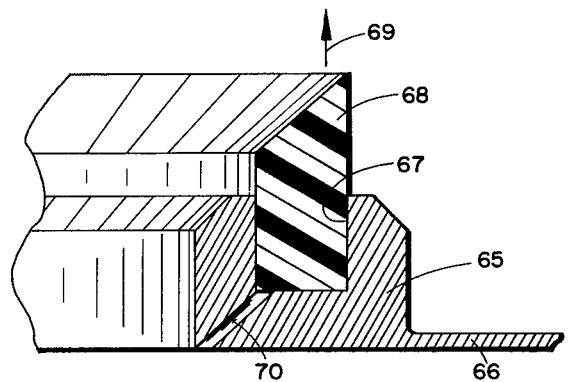
FIG. 5 is an alternative seal tip embodiment in cutaway section.

It is desirable in certain situations to provide means integral with the extremities of the bellows flexible wall for receiving and supporting the sealing ring in a manner which will prevent excessive seal deformation. FIG. 5 particularly illustrates a seal terminal member 65 including such an embodiment. The overall seal includes a flexible sidewall 66, comparable, for example, to wall or leg 31e of FIG. 3, to which annular seal ring retainer or terminal member 65 is affixed. An annular groove 67 in the retainer is adapted to receive sealing ring 68, preferably in a slip fit. Ring 68 is inserted into groove 67 such that the retainer acts as a back-up for the seal. The retainer thereby prevents undue deformation or bending of the extremity of ring 68 resultant from force exerted against structure in direction 69 or responsive to fluid pressure or mechanical force normally tending to bend the sealing ring in directions normal to that indicated by numeral 69. Sealing ring 68 may be bonded within groove 67 if desired, or it may remain as a slip fit. Regardless of the type of fit between sealing ring 68 and groove 67, the relative forces exerted therebetween due to seal side wall flexing and/or pressure actuation is generally sufficient to provide the desired sealing action. This configuration also provides for replaceability of seal ring 68 if it becomes worn or otherwise incapable of performing its sealing function.

One or more passages 70 communicating between the bottom of groove 67 and the bellows interior are sometimes provided to relieve pressure which under certain conditions tends to force seal ring 68 from its nested position in groove 67.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A pressure responsive seal comprising an annular convoluted spring member having a plurality of radially extending convolutions, the ends of said spring member having terminal portions etxending axially in opposite directions, a seal ring affixed to and extending beyond each said terminal portion in directions common therewith, said seal rings including sealing contact points positioned substantially at but yet outwardly from the R.M.S. diameter between an outer diameter and an inner diameter of said convolutions of said spring member, whereby said seal is substantially pressure balanced when equal fluid pressure is applied exteriorly and interiorly thereof.

2. The seal of claim 1 wherein at least one of said sealing contact points is located approximately 1% of the distance between said R.M.S. position and the outer diameter of said spring member.

3. The seal of claim 1 wherein at least one of said seal ring sealing contact points is located more than 1% of the distance between said R.M.S. position and the outer diameter of said spring member.

4. A valve and a seal combination comprising a valve housing, passage means leading through said housing, a ball retained for rotation in said housing and spaced therefrom to form a space between said ball and housing intermediate of said passage means, said ball including port means therethrough, means attached to said ball for rotating same and for moving said port means into and out of alignment with said passage means, a pressure responsive seal disposed within said housing and adapted to seal between said housing and said ball, said seal comprising a convoluted spring member having at least one radially and internally directed convolution including terminal portions, resilient seal means secured to and movable with at least one of said terminal portions and resiliently contacting a zonal segment of said ball, said spring member adapted to receive fluid pressure on the exterior thereof introduced through said passage means and said space and increase in contact pressure against said ball responsive to said fluid pressure.

5. A pressure responsive seal comprising a double ended longitudinally extending spring member having a plurality of radially extending convolutions between said ends, a terminal portion upon each said end extending oppositely away from one another, a seal ring attached to each said terminal portion and extending in directions common with said terminal portions, at least one of said seal rings including a sealing contact portion and being axially movable with said spring member, said spring member adapted to receive pressurized fluid upon either side thereof and being axially elongatable responsive to said pressurized fluid, and wherein at least one of said seal rings is adapted for sealing against a ball member and wherein said last mentioned seal ring includes a surface inclined at an angle such that upon initial sealing contact against the ball a segment only of said inclined surface contacts the ball surface at a point displaced outwardly from the R.M.S. diameter of said convoluted spring member.

References Cited by the Examiner
UNITED STATES PATENTS

| | | | |
|---|---|---|---|
| 2,191,232 | 2/1940 | Heinen | 251—174 |
| 2,548,120 | 4/1951 | Snyder | 251—174 |
| 2,751,185 | 6/1956 | Shand | 251—172 |
| 2,772,848 | 12/1956 | Holzer | 251—172 X |
| 2,777,664 | 1/1957 | Bryant | 251—174 |
| 2,799,470 | 7/1957 | Margave | 251—172 |
| 2,850,260 | 9/1958 | Perazone | 251—203 X |
| 2,875,917 | 3/1959 | Alkire | 277—206 X |
| 2,889,134 | 6/1959 | Bryant | 251—174 X |
| 2,989,990 | 6/1961 | Bass | 251—172 X |
| 3,047,007 | 7/1962 | Lunken | 251—172 X |
| 3,083,023 | 3/1963 | Creavey | 277—211 |

FOREIGN PATENTS

| | | |
|---|---|---|
| 162,475 | 3/1949 | Austria. |
| 12,152 | 12/1911 | Great Britain. |

ISADOR WEIL, *Primary Examiner.*

M. CARY NELSON, CLARENCE R. GORDON, *Examiners.*